US011942231B2

(12) United States Patent
Ito et al.

(10) Patent No.: US 11,942,231 B2
(45) Date of Patent: Mar. 26, 2024

(54) AIRTIGHT BOX FOR MEASUREMENT, AIRTIGHT APPARATUS, MEASUREMENT SYSTEM AND MEASUREMENT APPARATUS

(71) Applicant: RIGAKU CORPORATION, Akishima (JP)

(72) Inventors: Koichiro Ito, Tokyo (JP); Tetsuya Ozawa, Tokyo (JP); Takeshi Ozawa, Tokyo (JP)

(73) Assignee: RIGAKU CORPORATION, Akishima (JP)

( * ) Notice: Subject to any disclaimer, the term of this patent is extended or adjusted under 35 U.S.C. 154(b) by 606 days.

(21) Appl. No.: 16/950,081

(22) Filed: Nov. 17, 2020

(65) Prior Publication Data
US 2021/0166829 A1  Jun. 3, 2021

(30) Foreign Application Priority Data
Nov. 28, 2019  (JP) ................. 2019-215183

(51) Int. Cl.
| G21F 7/04 | (2006.01) |
| G01N 23/20016 | (2018.01) |
| G01N 23/20025 | (2018.01) |
| G21F 7/047 | (2006.01) |
| G01N 35/00 | (2006.01) |

(52) U.S. Cl.
CPC ............ *G21F 7/04* (2013.01); *G21F 7/047* (2013.01); *G01N 23/20016* (2013.01); *G01N 23/20025* (2013.01); *G01N 35/00* (2013.01); *G01N 2035/00277* (2013.01)

(58) Field of Classification Search
CPC ..... G21F 7/04; G21F 7/047; G01N 23/20016; G01N 23/20025; G01N 35/00; G01N 2035/00277
See application file for complete search history.

(56) References Cited

U.S. PATENT DOCUMENTS

| 9,507,139 B2 * | 11/2016 | Negishi ............... H01J 37/3053 |
| 11,525,790 B2 * | 12/2022 | Ito ..................... G01N 23/20025 |
| 2008/0067443 A1 * | 3/2008 | Todoroki ............... G01N 1/286 |
| | | 250/492.21 |

(Continued)

FOREIGN PATENT DOCUMENTS

| CN | 106229247 A | 12/2016 |
| JP | 2001-153760 A | 6/2001 |

(Continued)

OTHER PUBLICATIONS

Extended European Search Report dated Oct. 19, 2022, issued in counterpart EP Application No. 22197894.3. (9 pages).

(Continued)

*Primary Examiner* — Ryan D Walsh
(74) *Attorney, Agent, or Firm* — WHDA, LLP

(57) ABSTRACT

An airtight apparatus in which an airtight box (30) for measurement is combined with a glove box (20) is provided. The airtight box (30) for measurement includes a hollow housing (31), and a sample stage (34) having a sample loading portion. The sample stage (34) is transported by a transport stage (35) installed in the housing (31). The housing (31) is provided with a measurement window (40) for measuring a sample loaded on the sample stage (34) from the outside by a measurement apparatus (10).

15 Claims, 13 Drawing Sheets

(56) References Cited

U.S. PATENT DOCUMENTS

| | | | |
|---|---|---|---|
| 2009/0078060 A1 | 3/2009 | Moore et al. | |
| 2011/0180724 A1* | 7/2011 | Terada ................. | H01J 37/185 250/442.11 |
| 2013/0134325 A1* | 5/2013 | Negishi ................... | G01N 1/32 250/428 |
| 2016/0356810 A1 | 12/2016 | Ando | |
| 2019/0287755 A1 | 9/2019 | Kataoka et al. | |

FOREIGN PATENT DOCUMENTS

| | | |
|---|---|---|
| JP | 2014-86250 A | 5/2014 |
| JP | 2015-14569 A | 1/2015 |
| WO | 2019/161497 A1 | 8/2019 |

OTHER PUBLICATIONS

Office Action dated Nov. 21, 2022, issued in counterpart to JP Application No. 2019-215183, with English Translation. (8 pages).
Extended European Search Report dated Aug. 24, 2021, issued in counterpart EP application No. 20208530.4. (9 pages).
Office Action dated Sep. 8, 2023, issued in counterpart to CN Application No. 202011352668.4. (11 pages).

* cited by examiner

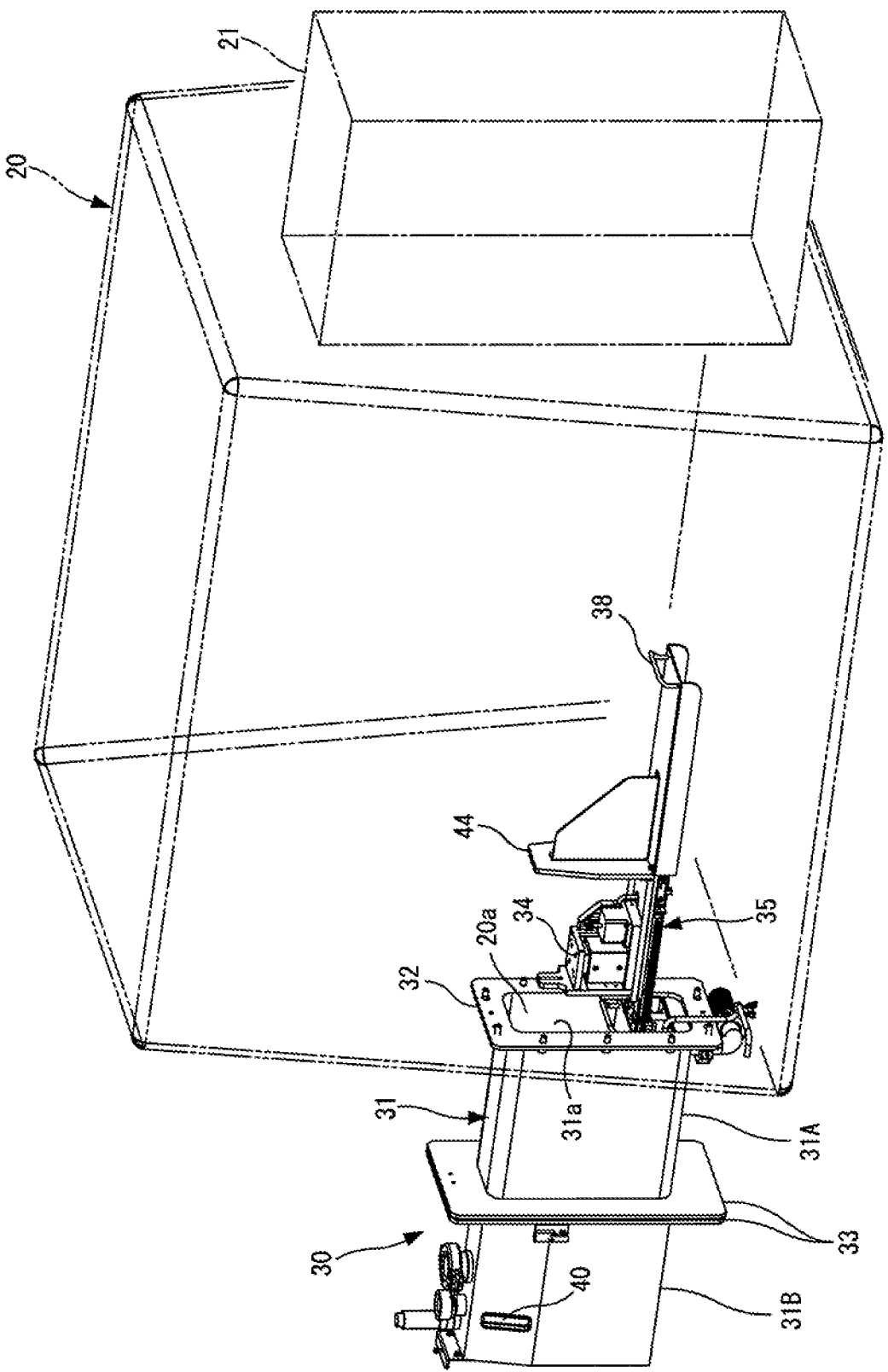

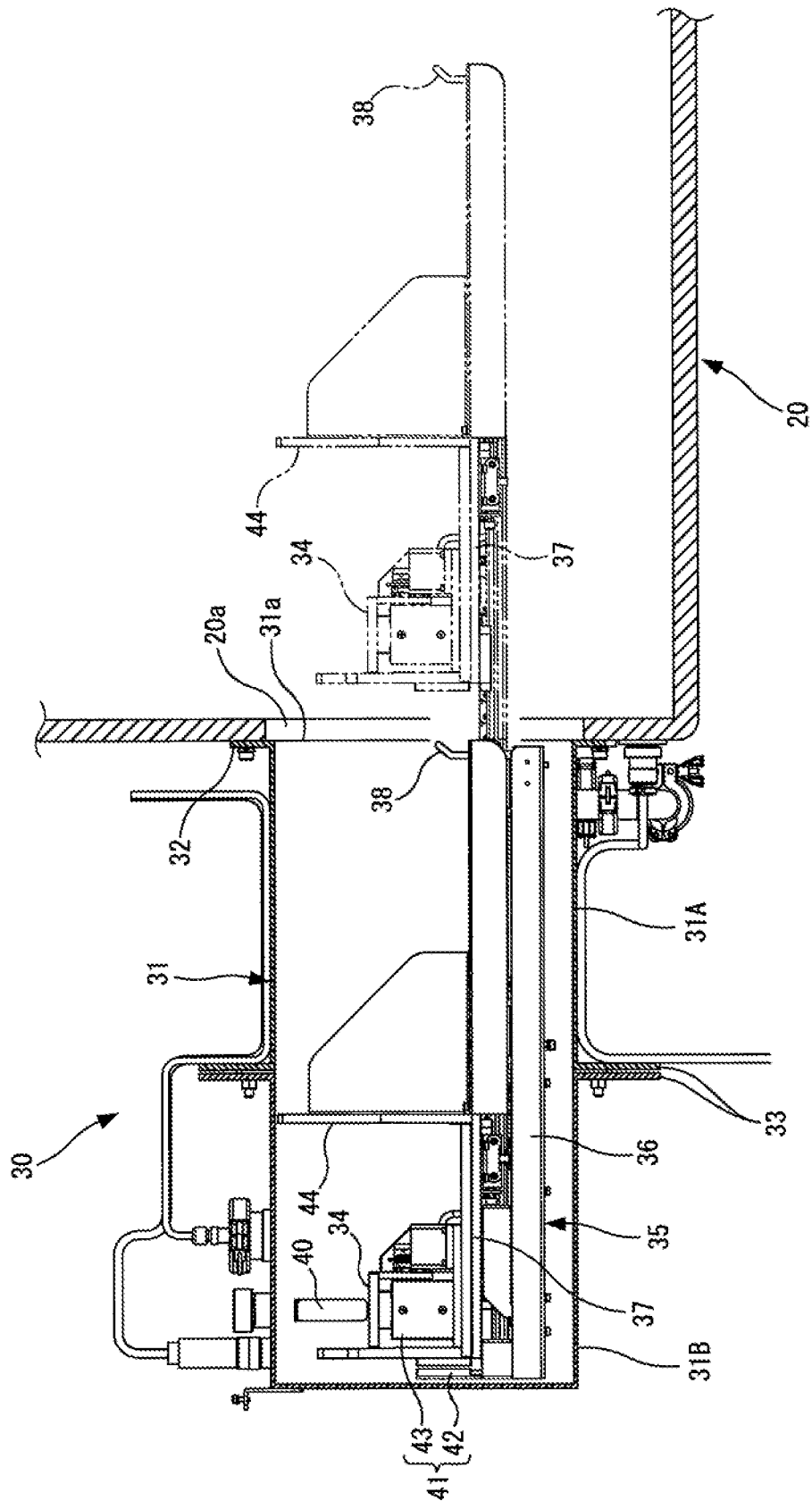

AIRTIGHT BOX FOR MEASUREMENT, AIRTIGHT APPARATUS, MEASUREMENT SYSTEM AND MEASUREMENT APPARATUS

FIELD OF THE INVENTION

The present invention relates to an airtight box for measurement suitable for measuring an anaerobic sample or the like, an airtight apparatus having a configuration in which the airtight box for measurement is connected to a glove box, a measurement system including the airtight apparatus, and a measurement apparatus which is suitable to be combined with the airtight box for measurement.

BACKGROUND OF THE INVENTION

When an anaerobic substance that easily chemically reacts with components in the atmosphere (oxygen, nitrogen, water, etc.) is used as a sample, it is necessary to place the sample in a closed space that does not come into contact with the atmosphere and perform measurement and analysis on the sample. Further, even when a substance that is dangerous to a measurer and requires the measurer to exercise caution when handling it is used as a sample, it is also necessary to place the sample in a closed space and perform measurement and analysis on the sample while the sample is prevented from scattering or leaking to the outside.

Japanese Patent Laid-Open No. 2015-14569 (Patent Literature 1) discloses an atmosphere control glove box apparatus integrated with an X-ray diffraction apparatus that enables this kind of measurement and analysis.

In the conventional apparatus disclosed in Patent Literature 1 includes a biaxial diffractometer (11) as an X-ray diffraction apparatus and a glove box (3) which are connected to each other via an intermediary chamber (9). A sample table (30) of the X-ray diffraction apparatus is arranged in the intermediary chamber (9). The sample is manually set on the sample table (30) in the intermediary chamber (9) via an internal space of the glove box (3) by using a glove (3b).

In the intermediary chamber (9), for example, an atmosphere in which an inert gas circulates is formed through the glove box (3). The measurement by the X-ray diffraction apparatus is performed while the sample is placed inside this intermediary chamber (9).

The conventional apparatus disclosed in Patent Literature 1 has a configuration in which the X-ray diffraction apparatus and the intermediary chamber are integrated with each other and the periphery of the sample table of the X-ray diffraction apparatus is covered by the intermediary chamber. Therefore, the sample must be manually loaded and unloaded onto and from the sample table fixed to the X-ray diffraction apparatus via the inside of the glove box as described above, which has posed a problem in workability.

SUMMARY OF THE INVENTION

The present invention has been made in view of the above circumstances, and has an object to provide an airtight box for measurement, an airtight apparatus, and a measurement system that are capable of easily measuring an anaerobic sample without exposing to the atmosphere.

In order to attain the above object, according to the present invention, an airtight box for measurement for placing therein a sample to be measured by a measurement apparatus installed outside, comprises: a housing that is hollow therein and has a connecting unit for connecting the housing to a glove box; a sample stage including a sample loading portion; and a measurement window that is provided in the housing to measure a sample loaded on the sample stage from the outside by the measurement apparatus, wherein the connecting unit of the housing is connected to a glove box which is arranged outside side by side together with the airtight box for measurement, whereby the inside of the housing communicates with the inside of the glove box, and the inside of each of the housing and the glove box is put into an airtight state.

According to the airtight box for measurement having the above-described configuration, it is possible to easily realize the measurement of an anaerobic sample in combination with the measurement apparatus without exposing to the atmosphere.

Here, the airtight box for measurement according to the present invention may comprise a transport stage that is installed in the housing and transports the sample stage, and the transport stage may be configured to extend a transport track of the sample stage up to the inside of the glove box connected to the housing.

By providing the transport stage for transporting the sample stage in the housing, the sample can be placed inside the housing without requiring an operator to insert his or her hand deeply inside the housing, so that workability can be enhanced.

Further, in the airtight box for measurement according to the present invention, a measurement position is set inside the housing. Therefore, the airtight box for measurement according to the present invention is preferably configured to further comprise a sample position adjustment mechanism for positioning the sample loaded on the sample stage at the measurement position.

By providing such a sample position adjustment mechanism, it is possible to accurately position the sample at the measurement position of the measurement apparatus and realize highly accurate measurement.

The airtight box for measurement according to the present invention may further comprise a pipe communicating with the inside of the housing, and the pipe may be configured to connect with at least one of a vacuum suction pipe and an inert gas supply source.

As a result, it is possible to quickly set the inside of the housing to a vacuum atmospheric state or an inert gas atmospheric state.

Further, in the airtight box for measurement according to the present invention in which the measurement apparatus is an X-ray analyzing apparatus and X-rays are incident and emitted through the measurement window, the housing is formed of a material that shields X-rays. For example, it is preferable that the housing is configured to prevent scattered X-rays in the airtight box for measurement from leaking to the outside. Note that the measurement window is formed of a material that transmits X-rays.

Further, it is preferable that the airtight box for measurement further comprises an X-ray shielding member for shielding intrusion of X-rays from the inside of the housing into the glove box.

By providing the X-ray shielding member, a work in the glove box can be performed in parallel with measurement by the X-ray analysis apparatus, so that the efficiency of the work can be enhanced.

An airtight apparatus according to the present invention comprises the airtight box for measurement having the foregoing configuration, and a glove box connected to the housing of the airtight box for measurement, and the inside of each of the housing and the glove box is put into an airtight state.

Since the airtight box for measurement is provided with the sample stage in the housing, the thus-configured airtight apparatus can be also used for measurement to be performed by using various measurement apparatuses without being integrated with each measurement apparatus, and thus it is highly versatile.

Here, the glove box may be configured to include a blocking member that blocks an opening portion communicating with the inside of the housing to partition off the inside of the glove box from the inside of the housing, thereby putting the inside of the glove box into an airtight state.

The inside of the glove box is partitioned off from the inside of the housing by this blocking member, so that a work environment that should be performed independently inside each of the glove box and the airtight box for measurement can be prepared in such a case that maintenance of the glove box or the airtight box for measurement is performed.

Further, a measurement system according to the present invention comprises a measurement apparatus and the airtight apparatus having the foregoing configuration, and measures a sample loaded on the sample stage through the measurement window by the measurement apparatus.

According to the thus-configured measurement system, since the airtight apparatus is provided with the sample stage in the housing, various measurements can be performed by combining an appropriately selected measurement apparatus with the airtight apparatus.

Further, the measurement system according to the present invention may be configured so that the measurement apparatus includes a controller for outputting a control signal for controlling the sample position adjustment mechanism and measure a sample loaded on the sample stage through the measurement window by the measurement apparatus.

Further, the measurement system according to the present invention may be configured such that an X-ray analysis apparatus having a goniometer is applied as the measurement apparatus, and a positioning member for fixing and positioning the airtight box for measurement to the goniometer is provided.

The positioning member makes it possible to position the sample stage provided in the airtight box for measurement at the measurement position of the X-ray analysis apparatus with higher accuracy.

A measurement apparatus according to the present invention is a measurement apparatus for measuring a sample loaded on the sample stage provided in the above-described airtight box for measurement through the measurement window, wherein an opening/closing door is provided, a measurement position is set inside the opening/closing door, and the opening/closing door includes a cutout through which a part of the housing is inserted to arrange the measurement window at a position corresponding to the measurement position.

By providing such a cutout in the opening/closing door, the measurement window of the airtight box for measurement can be arranged at a position corresponding to the measurement position with a simple configuration.

Here, the cutout formed in the opening/closing door allows a part of the housing having a flange at an intermediate portion thereof to pass through the cutout, and is formed to be smaller than an outer shape of the flange, and a mount portion of the flange is provided near the inside of the opening/closing door.

The inside and outside of the opening/closing door can be partitioned by the flange.

Further, the above-described measurement apparatus is preferably provided with a sensor for detecting a state where the opening/closing door is closed and the flange is mounted at the mount portion.

This sensor makes it possible to check the closed state of the opening/closing door and the state where the cutout is partitioned by the flange.

As described above, according to the present invention, desired measurement for an anaerobic sample can be easily realized without exposing to the atmosphere.

BRIEF DESCRIPTION OF THE DRAWINGS

FIG. 4 is a perspective view showing the appearance of an airtight box for measurement connected to a side wall of a glove box;

FIG. 7 is a front view showing the appearance of a transport stage;

DETAILED DESCRIPTION OF EMBODIMENTS

Hereinafter, embodiments of the present invention will be described in detail with reference to the drawings.

[Schematic Structure of Measurement System]

Figure 1:
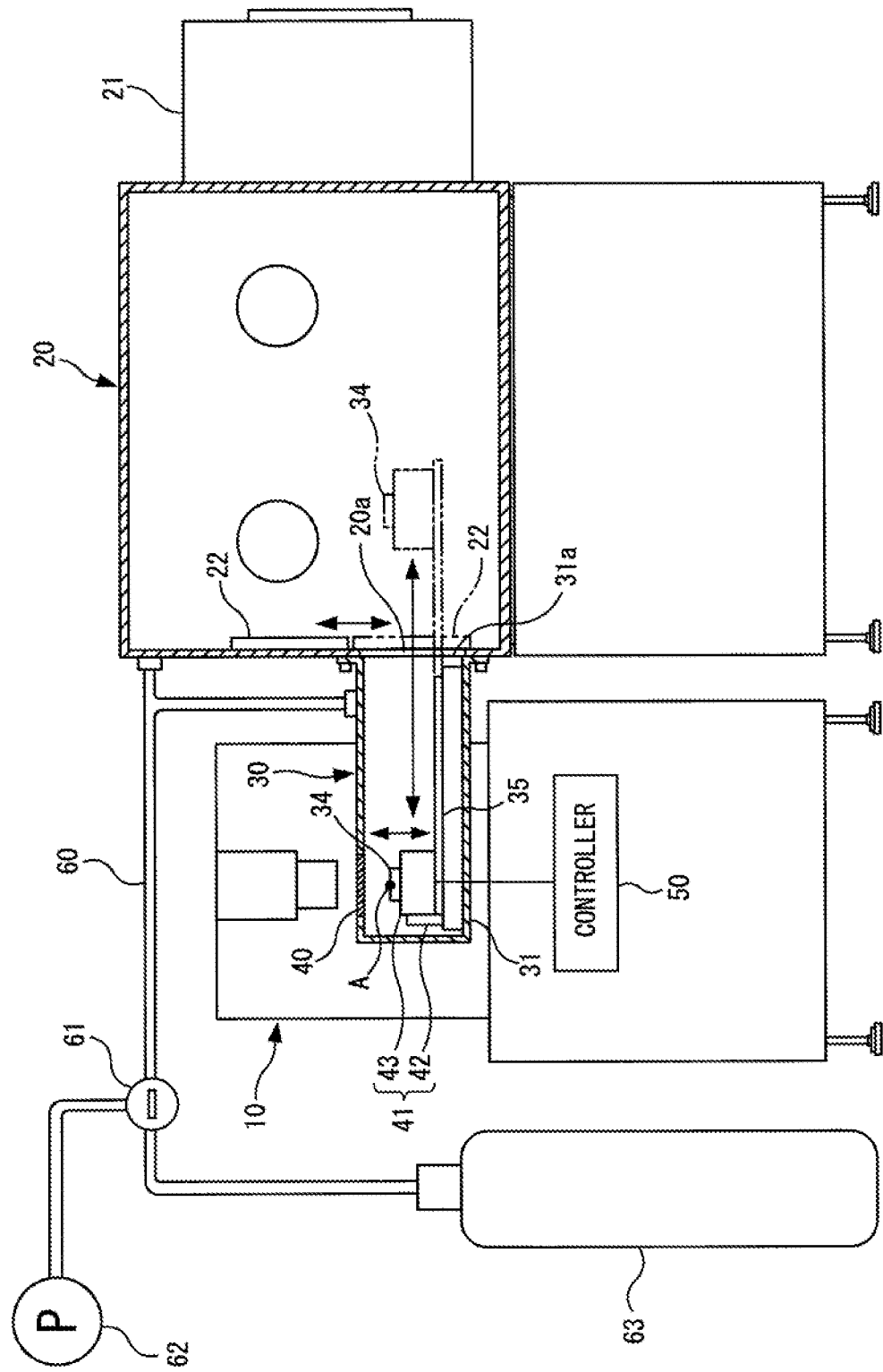
FIG. 1 is a partially cross-sectional front view showing a schematic structure of a measurement system according to an embodiment of the present invention.

FIG. 1 is a partially cross-sectional front view showing a schematic structure of a measurement system according to an embodiment of the present invention. First, the schematic structure of the measurement system according to the embodiment of the present invention will be described with reference to FIG. 1.

The measurement system is configured by the combination of a measurement apparatus 10, a glove box 20, and an airtight box 30 for measurement. Further, the combination of the glove box 20 and the airtight box 30 for measurement constitutes the airtight apparatus.

The measurement apparatus 10 is an apparatus capable of irradiating a sample as a measurement target in the airtight box 30 for measurement with an electromagnetic wave from an energy source (a light source on an incident side) installed in the atmosphere, detecting photons emitted from the sample by a detector which is outside the airtight box for measurement and installed in the atmosphere and performing analysis. A non-destructive inspection machine that uses X-rays, ultraviolet rays, visible rays, terahertz waves, or the like can be arbitrarily selected and applied as the measurement apparatus 10 according to the purpose of measurement. For example, when a substance constituting a sample or a crystal structure of the substance or morphological analysis of the inside and outside of the sample is determined, an X-ray diffraction apparatus, a fluorescent X-ray apparatus, and an X-ray CT apparatus using an X-ray wavelength can be applied as the measurement apparatus 10.

As is well known, the glove box (GB) 20 is a physical and chemical apparatus that has an internal space having a closed structure and is capable of performing various operations in the internal space in a state where it is shielded from the outside air. Rubber gloves that can be inserted into the internal space are provided on the front of the glove box 20 so that an operator can wear these rubber gloves on both hands and operates samples, tools, etc. inside the glove box 20.

The glove box 20 is also provided with an auxiliary box called an antechamber 21 (pass box) which is arranged side by side together with the glove box 20 and used to insert/remove articles into/from the glove box 20, and samples, tools, etc. are inserted into the glove box 20 via the antechamber 21. After operations have been finished, the samples, the tools, and the like in the glove box 20 can be removed to the outside via the antechamber 21.

The airtight box 30 for measurement includes a housing 31 having a hollow therein. The housing 31 has a laterally elongated shape, and one side end surface 31a (right end surface in FIG. 1) thereof is opened. The opened side end surface 31a is connected to a side wall of the glove box 20 which is arranged outside side by side together with the airtight box 30 for measurement. The glove box 20 is provided with an opening portion 20a at a side wall portion thereof to which the housing 31 is connected, and this opening portion 20a is aligned with the opening of the side end surface 31a in the housing 31, whereby the inside of the housing 31 can be caused to communicate with the inside of the glove box 20.

Here, the inside of the housing 31 is configured to have no gap except for the opening of the side end surface 31a.

Therefore, the inside of the housing 31 and the inside of the glove box 20 which are connected to each other are put into an airtight state.

Note that known connecting means can be appropriately selected and used as a method of connecting the housing 31 to the glove box 20. For example, it is possible to construct a connecting structure by providing a flange on a side end edge of the housing 31, bringing the flange into close contact with the side wall of the glove box 20 via packing, and fixing the flange to the side wall of the glove box 20 with fasteners such as bolts and nuts or the like.

A sample stage 34 and a transport stage 35 are provided inside the housing 31. The sample stage 34 is mounted on the transport stage 35. The transport stage 35 is transport means for transporting the sample stage 34 in an axial direction (right-and-left direction in FIG. 1) of the housing 31. The transport stage 35 can be configured by using, for example, a known slider mechanism.

Here, the transport stage 35 is configured to be able to transport the sample stage 34 to the inside of the glove box 20. By extending a transport track of the sample stage 34 to the inside of the glove box 20 as described above, it is possible to load a sample onto the sample stage 34 in the glove box 20 and easily transport the sample stage 34 into the housing 31 as it is, thereby enhancing workability.

The sample stage 34 is provided with a sample loading portion, and the sample is loaded onto the loading portion. The work of loading the sample onto the sample stage 34 is performed inside the glove box 20 as described above.

Further, the housing 31 is provided with a measurement window 40. The measurement window 40 is a component for measuring the sample loaded on the sample stage 34 from the outside of the housing 31 by the measurement apparatus 10. The position at which the measurement window 40 is formed adjusted so that the sample placed inside the housing 31 can be measured by the measurement apparatus 10 to be used in combination.

Further, the measurement window 40 is closed by a window member to keep the inside of the housing 31 in an airtight state. A material to be applied to the window member is selected according to the measurement apparatus 10 to be used in combination. It is possible to perform analysis with the measurement apparatus 10 using X-rays, ultraviolet rays, visible rays, or terahertz waves by using, for example, a material such as beryllium, silicon nitride, glassy carbon, Ge (germanium), Si (silicon), diamond, sapphire, CaF2 (calcium fluoride), ZnSe (zinc selenide), ZnS (zinc sulfide), chalcogenide glass or quartz as the material for the window member.

Further, by using a material (transmitting therethrough light or the like) having a wavelength common to a plurality of measurement apparatuses 10 for the window member, it is also possible to configure the airtight box 30 for measurement with which measurements can be performed by the plurality of measurement apparatuses 10.

A measurement position A is preset inside the housing 31. The measurement position A preset inside the housing 31 is positionally adjusted so as to coincide with a measurement position (not shown) set in the measurement apparatus 10 when the measurement system is constructed by combining the airtight box 30 for measurement with the measurement apparatus 10.

Further, when a measurement is performed, a sample loaded on the sample stage 34 is positioned at the measurement position A set inside the housing 31. In order to perform this positioning, the airtight box 30 for measurement is provided with a sample position adjustment mechanism 41. Various moving mechanisms capable of moving and adjusting the sample so that the measurement position coincides with the measurement position A can be applied to the sample position adjustment mechanism 41.

For example, the positioning in the axial direction of the housing 31 can be realized by a configuration in which the transport stage 35 is provided with a stopper 42, and the movement of the transport stage 35 is stopped by the stopper 42 when the sample loaded on the sample stage 34 has reached the measurement position A. Further, the positioning in the height direction can be realized by incorporating an elevating mechanism 43 into the sample stage 34 and adjusting the height position of the sample by driving the elevating mechanism 43.

Note that with respect to a front-and-rear direction (a direction vertical to the paper surface of FIG. 1), the front-and-rear positions of the sample stage 34 and the transport stage 35 may be adjusted in advance according to the measurement position A. Further, if necessary, a front-and-rear drive mechanism may be incorporated in the sample stage 34.

Here, the elevating mechanism 43 incorporated in the sample stage 34 is controlled to be driven based on a control signal from a controller 50 installed in the measurement apparatus 10, and positions the sample loaded on the sample stage 34 at the measurement position A.

The measurement window 40 described above is formed at a place corresponding to the measurement position A set inside the housing 31. In other words, the measurement window 40 is formed in the housing 31 while positionally adjusted so that the measurement apparatus 10 can measure the sample placed at the measurement position A set inside the housing 31 through the measurement window 40.

Further, a pipe 60 is connected to each of the glove box 20 and the housing 31 of the airtight box 30 for measurement. The pipe 60 is configured to be connectable to any one of a vacuum suction pump 62 and an inert gas supply source 63 by switching a valve 61. As described above, the measurement system (and the airtight apparatus) of the present embodiment connects the pipe 60 to not only the glove box 20, but also the housing 31 of the airtight box 30 for measurement, whereby the inside of the housing 31 can be directly evacuated and an inert gas can be directly supplied into the housing 31. Therefore, the inside of the housing 31 can be quickly set to the same atmospheric state as the inside of the glove box 20.

Note that the glove box 20 is provided with a blocking member 22 for blocking the opening portion 20a. The blocking member 22 is configured so as to be manually operated from the inside of the glove box 20 to be moved to and fixed at a position where the opening portion 20a is blocked.

The inside of the glove box 20 is partitioned off from the inside of the housing 31 by the blocking member 22, whereby it is possible to prepare a work environment to be independently performed in each of the boxes 20 and 30 when maintenance of the glove box 20 and the airtight box 30 for measurement is performed or the like. For example, a maintenance work in the glove box 20 can be performed while maintaining the atmosphere inside the glove box 20. Further, the maintenance of the airtight box 30 for measurement can be performed independently while maintaining the atmosphere inside the glove box 20.

[Specific Configuration Example of Measurement System]

Next, a specific configuration example of the measurement system according to the embodiment of the present invention in which the measurement apparatus is an X-ray diffraction apparatus will be described in detail with reference to FIGS. 2 to 12.

Figure 2:
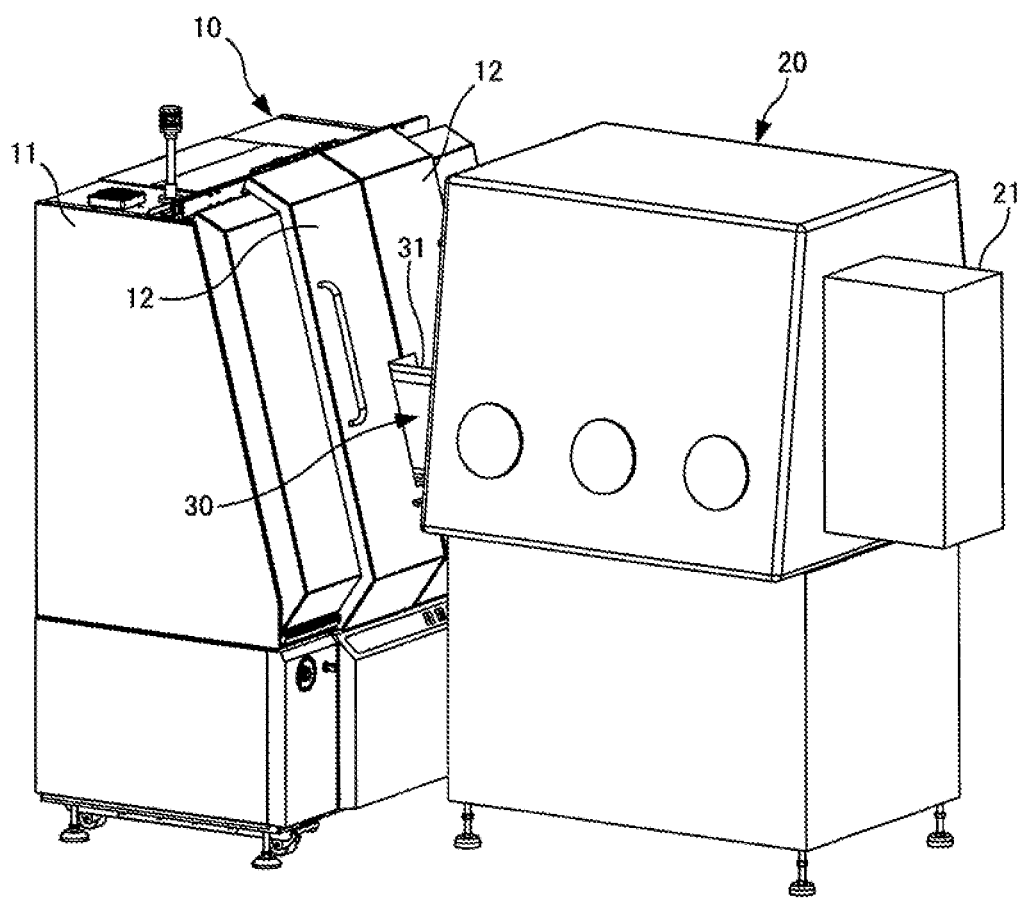
FIG. 2 is a perspective view showing the appearance of the measurement system according to the embodiment of the present invention in which a measurement apparatus is an X-ray diffraction apparatus.
Figure 3A:
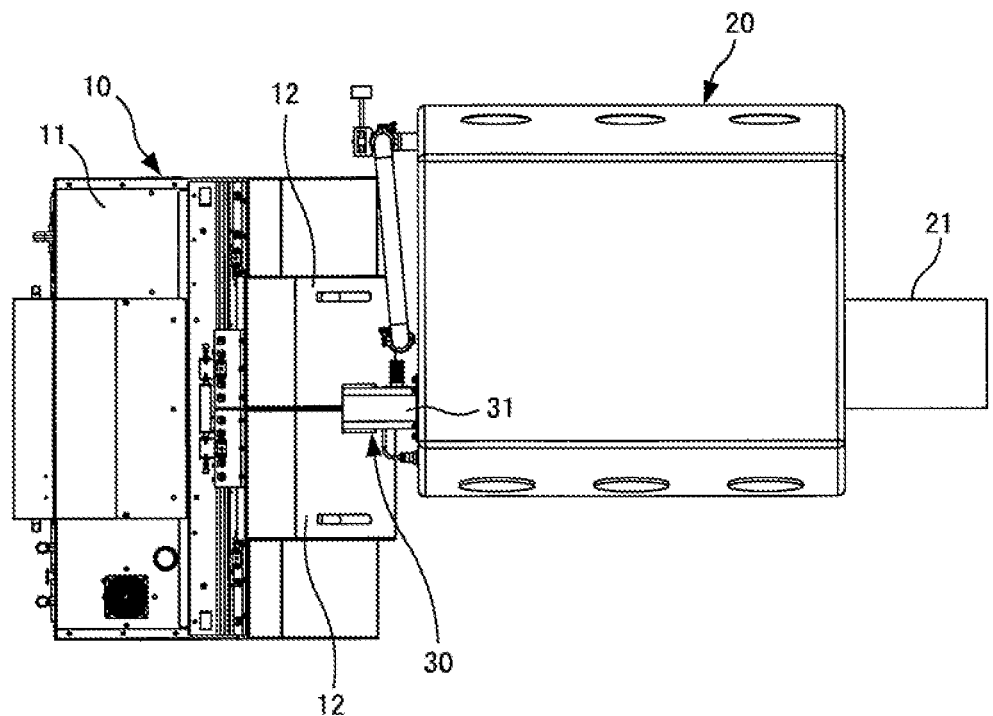
FIG. 3A is a plane view showing the appearance of the measurement system according to the embodiment of the present invention.
Figure 3B:
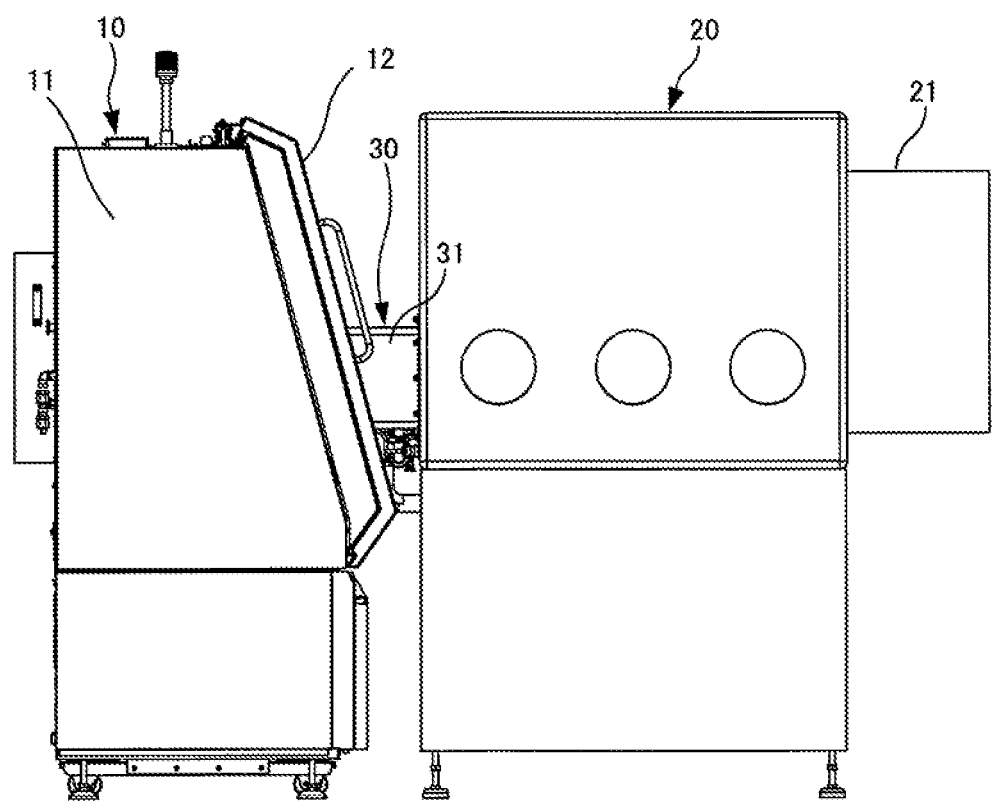
FIG. 3B is a front view of the appearance of the measurement system according to the embodiment of the present invention.

FIG. 2 is a perspective view showing the appearance of the measurement system according to the present embodiment in which the measurement apparatus is an X-ray diffraction apparatus, FIG. 3A is a plan view showing the appearance of the measurement system according to the present embodiment, and FIG. 3B is a front view showing the appearance of the measurement system according to the present embodiment.

Note that the same parts as or corresponding parts to those of the schematic structure shown in FIG. 1 are represented by the same reference signs.

The measurement system according to the present embodiment is configured by the combination of the X-ray diffraction apparatus 10 as the measurement apparatus, the glove box 20, and the airtight box 30 for measurement.

The X-ray diffraction apparatus 10 is an apparatus often used in material study because it can provide information on the crystallinity, crystal structure, and crystal orientation of a material in a non-destructive and non-contact manner and can identify unknown substances. In general, the X-ray diffraction apparatus 10 includes an X-ray source for generating X-rays, a goniometer for accurately measuring an angle, and an X-ray detector for measuring X-ray intensity, and data processing system for controlling these components and calculates count values.

Generally, examples of the goniometer include a $\theta$-$2\theta$ type goniometer in which the position of the X-ray source is fixed and the sample is rotated by an angle of $\theta$ at the same time when the X-ray detector is rotated by an angle of $2\theta$, and a $\theta$-$\theta$ type goniometer in which the X-ray source and the X-ray detector operate while keeping the same angle with respect to a horizontally arranged sample.

In this embodiment, since it is necessary to deal with a sample having high fluidity and the sample stage 34 for loading the sample is installed in the airtight box, a configuration in which an X-ray diffraction apparatus 10 adopting the $\theta$-$\theta$ type goniometer for the horizontally arranged sample is used as the measurement apparatus will be described.

These components constituting the X-ray diffraction apparatus 10 are accommodated and arranged inside an X-ray shielding cover 11, and a safety measure is taken to prevent X-rays from leaking to the outside during measurement.

Further, the X-ray shielding cover 11 shown in the figure is provided with opening/closing doors 12 on the front surface thereof. In the present embodiment, a part of the housing 31 of the airtight box 30 for measurement is inserted into the X-ray shielding cover 11 so that the part of the housing 31 penetrates through the opening/closing doors 12.

FIG. 4 is a perspective view showing the appearance of the airtight box for measurement connected to the side wall of the glove box. The airtight apparatus of the present embodiment is constructed by the combination of the glove box 20 and the airtight box 30 for measurement as shown in figures.

The airtight box 30 for measurement includes a housing 31, a transport stage 35, and a sample stage 34. The housing 31 is connected to the side wall of the glove box 20, and the inside of the housing 31 communicates with the inside of the glove box 20. The housing 31 is made of a material that shields X-rays, and X-rays do not intrude into the housing 31 from portions other than the measurement window 40. The transport stage 35 transports the sample stage 34 in the axial direction of the housing 31, and further extends the transport path thereof to the inside of the glove box 20.

Figure 5A:
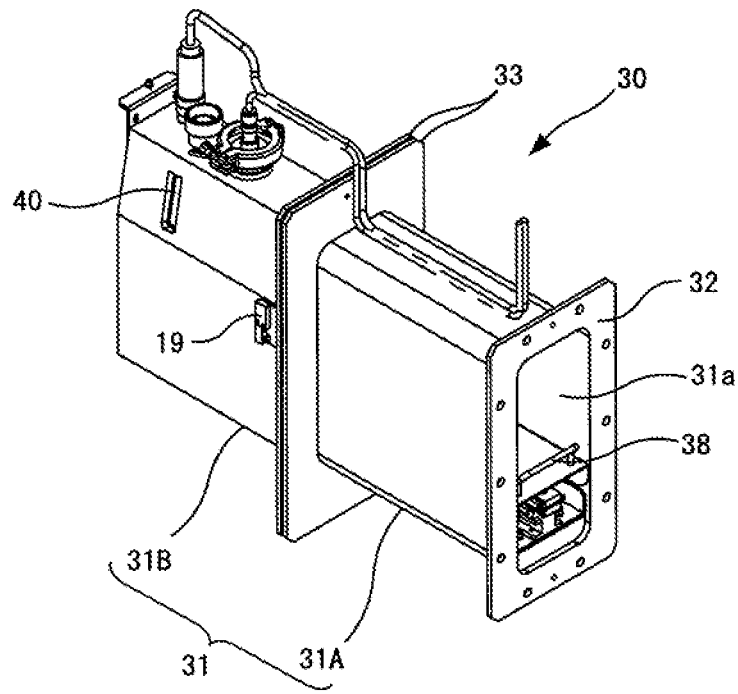
FIG. 5A is a perspective view showing the appearance of a housing constituting the airtight box for measurement.
Figure 5B:
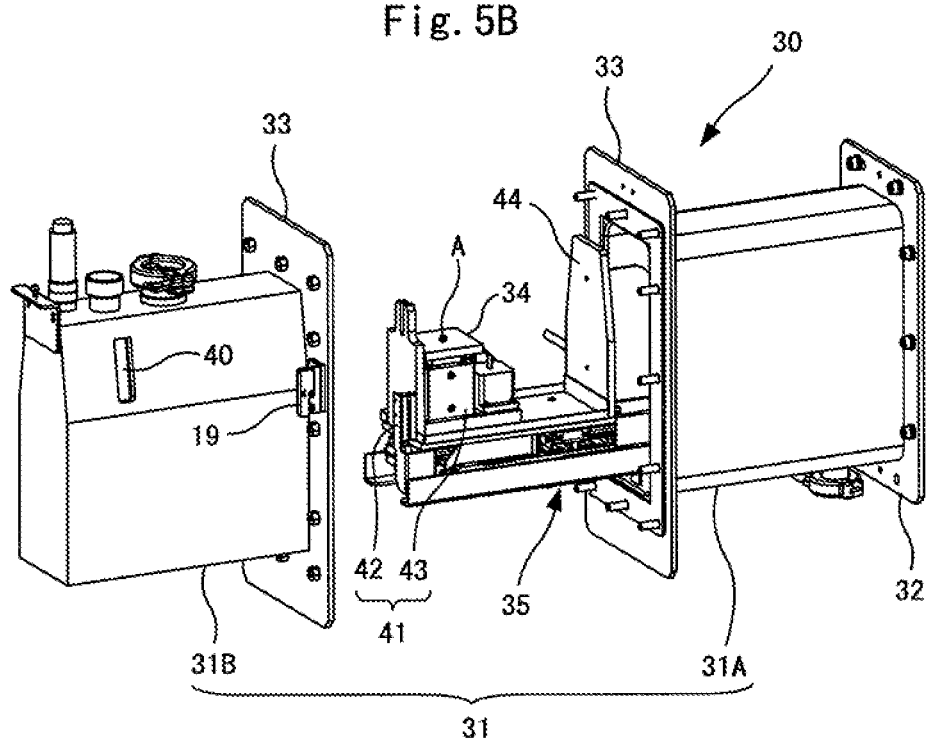
FIG. 5B is a perspective view showing a two-divided structure of the housing.

FIG. 5A is a perspective view showing the appearance of the housing constituting the airtight box for measurement, and FIG. 5B is a perspective view showing the two-divided structure of the housing.

The housing 31 is hollow therein and has a laterally elongated shape, and one side end surface 31a thereof is opened. A flange (side end flange 32) is formed on the side end edge of the housing 31 which is a peripheral edge of the opening. A connection structure is constructed in the housing 31 by bringing the side end flange 32 into contact with the side wall of the glove box 20 via a packing (not shown) and fixing the side end flange 32 to the side wall of the glove box 20 with fasteners such as bolts and nuts or the like (see FIG. 4).

As shown in FIG. 5B, the housing 31 is divided into two parts at a middle portion in the axial direction, and a housing element (a housing base end portion 31A) on a base end portion side with respect to the middle portion is kept to be connected to the side wall of the glove box 20 whereas a housing element (a housing tip portion 31B) on a tip portion side with respect to the middle portion is freely detachable. In other words, flanges (middle flanges 33) are formed at joint portions of the housing base end portion 31A and the housing tip end portion 31B, and the middle flanges 33 are brought into contact with each other via a packing (not shown) and fastened to each other by using fasters such as bolts and nuts or the like, thereby constructing an integrated housing 31.

Further, the housing tip portion 31B can be easily separated from the housing base end portion 31A by merely removing the fasteners. By removing the housing tip portion 31B in this way, operations such as maintenance and adjustment of the sample stage 34 and the transport stage 35 provided inside the housing 31 or change of the configuration of the sample stage 34 can be easily and quickly performed.

As shown in FIG. 5B, the measurement position A is set inside the housing 31. The housing 31 is arranged relatively to the X-ray diffraction apparatus 10 in a state where the measurement position A is positioned at a measurement position set in the X-ray diffraction apparatus 10 (hereinafter may be referred to as an X-ray irradiation position). The sample is loaded on the sample stage 34 and is arranged at the measurement position A through the transport operation by the transport stage 35 and the elevating operation by the sample stage 34.

The X-ray diffraction apparatus 10 irradiates the sample placed at the measurement position A inside the housing 31 with X-rays, and detects diffracted X-rays reflected from the sample by the X-ray detector.

Figure 6:
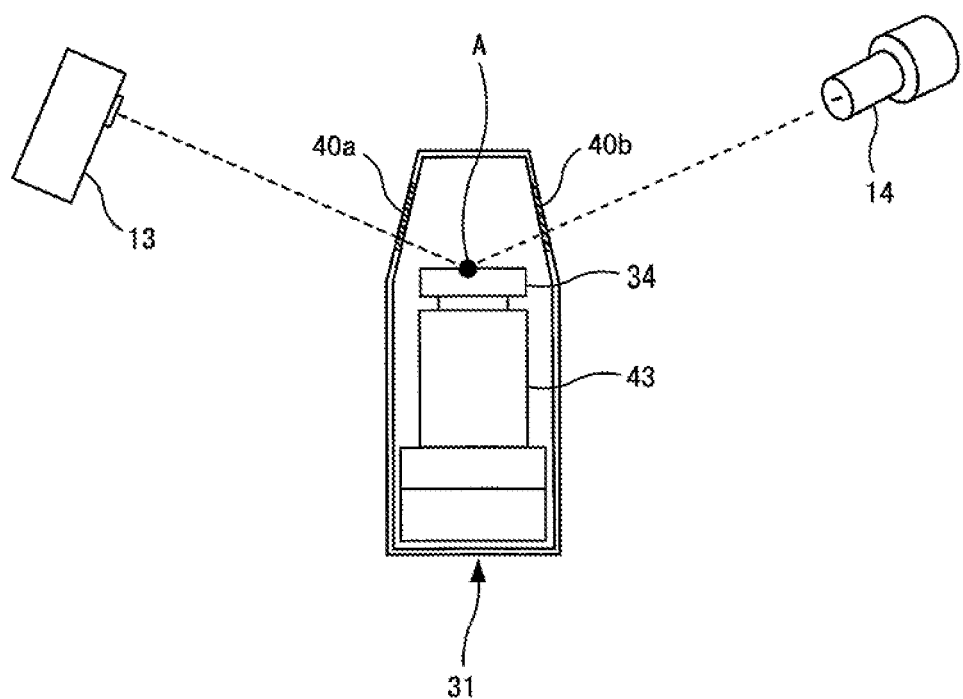
FIG. 6 is a side cross-sectional view showing a measurement window provided in the housing.

FIG. 6 is a side cross-sectional view showing the measurement window provided in the housing.

The measurement window 40 includes an incidence-side measurement window 40a and an emission-side measurement window 40b. As described above, the sample is placed at the measurement position A set in the housing 31. The incidence-side measurement window 40a is provided at a place where X-rays from the X-ray source 13 can be incident therethrough and the surface of the sample placed at the measurement position A can be irradiated with the X-rays. Further, the emission-side measurement window 40b is provided at a place where diffracted X-rays reflected from the surface of the sample placed at the measurement position A can be emitted to the X-ray detector 14 provided outside.

The measurement window 40 is blocked by a window member made of a material (for example, beryllium) having a characteristic of blocking the atmosphere, but transmitting X-rays therethrough.

Note that the measurement window 40 can be formed in a continuous linear shape extending from an upper portion of the front surface to an upper portion of the back surface through the upper surface, for example.

FIG. 7 is a front view showing the appearance of the transport stage.

The transport stage 35 is configured so that a slider 37 slides along a guide rail 36 fixed to the floor surface of the housing 31 to enable the sample stage 34 to be transported to the inside of the glove box 20. The sample stage 34 is mounted on the upper surface of the slider 37.

The slider 37 is provided with an operating handle 38 at an end portion thereof on the glove box 20 side. The operator can grasp the operating handle 38 from the inside of the glove box 20 and easily move the slider 37. Note that although not shown in FIG. 7, the slider 37 includes an intermediate slider and an upper slider, and the intermediate slider engages with the upper slider and moves integrally with the upper slider in a process of moving the upper slider to the tip portion of the housing 31. As a result, the sample stage 34 can be pulled out from the housing 31 and moved to the inside of the glove box 20.

Note that it is also possible to install a drive motor for driving the transport stage 35 in the airtight box 30 for measurement and control the drive motor based on a control signal from the controller 50 (see FIG. 1) provided in the measurement apparatus (X-ray diffraction apparatus) 10 to move the transport stage 35.

The slider 37 of the transport stage 35 is provided with an X-ray shielding member 44 at a position where the X-ray shielding member 44 is closer to the glove box 20 than the sample stage 34. The X-ray shielding member 44 is formed in a plate-like shape with a material capable of shielding X-rays, and arranged along the cross-section of the housing 31. The internal space of the housing 31 is partitioned off by the X-shielding member 44. Therefore, scattered X-rays generated around the sample stage 34 during the X-ray diffraction measurement are shielded by the housing 31 and the X-ray shielding member 44, so that leakage of the X-rays to the glove box 20 side can be prevented.

Figure 8A:
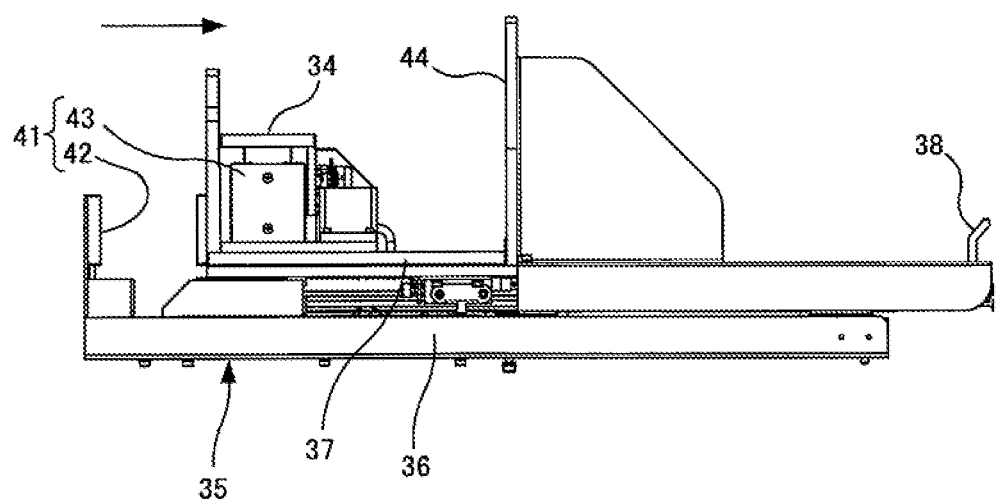
FIGS. 8A and 8B are front views showing a sample position adjustment mechanism to a measurement position.
Figure 8B:
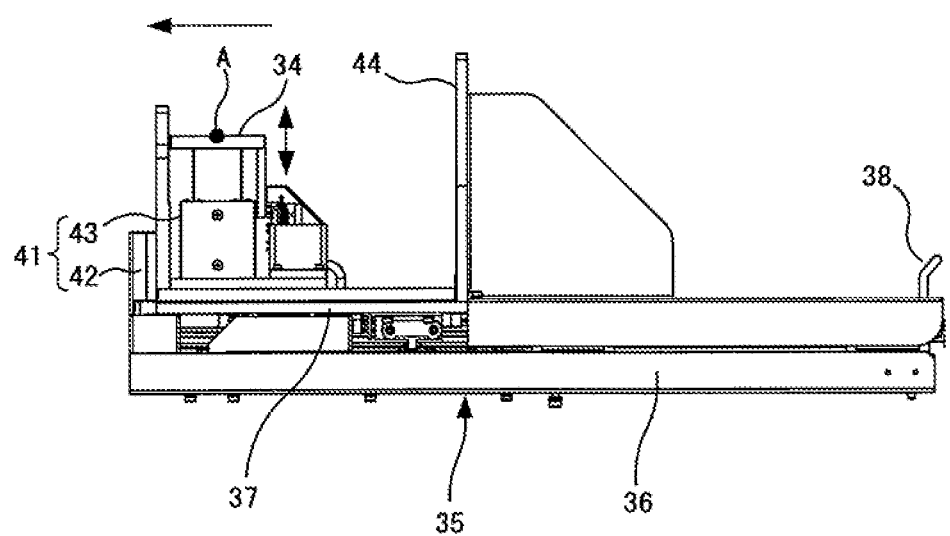

FIGS. 8A and 8B are front views showing the sample position adjustment mechanism to the measurement position.

Like the schematic structure described above, the measurement position A is preset inside the housing 31.

The stopper 42 is fixedly provided inside the housing 31 and on the floor surface near the tip of the housing 31. The stopper 42 abuts against the sample stage 34 that has been moved to the tip of the housing 31 by the transport stage 35, thereby restricting the movement of the sample stage 34. The setup position of the stopper 42 is adjusted so that when the sample stage 34 abuts against the stopper 42, the sample loaded on the sample stage 34 is positioned at the same position in the axial position as the measurement position A set in the housing 31.

Further, the sample stage 34 is incorporated with the elevating mechanism 43 for adjusting the height position of the sample. The position adjustment in the height direction with respect to the measurement position A set in the housing 31 is performed by the elevating mechanism 43. The stopper and the elevating mechanism 43 constitute the sample position adjustment mechanism 41 for positioning the sample loaded on the sample stage 34 at the measurement position A.

Figure 9A:
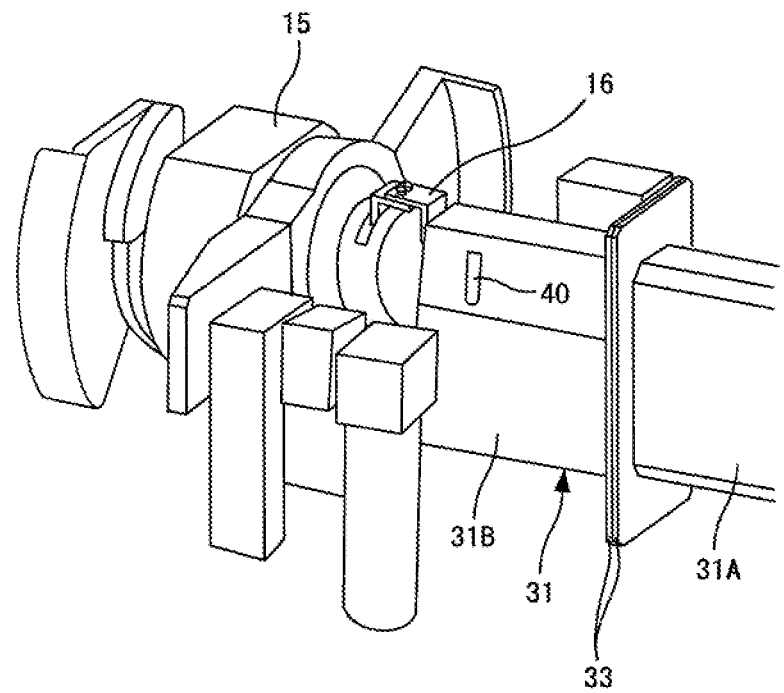
FIG. 9A is a perspective view showing a structure in which a tip portion of the housing is fixed to a goniometer of the X-ray diffraction apparatus.
Figure 9B:
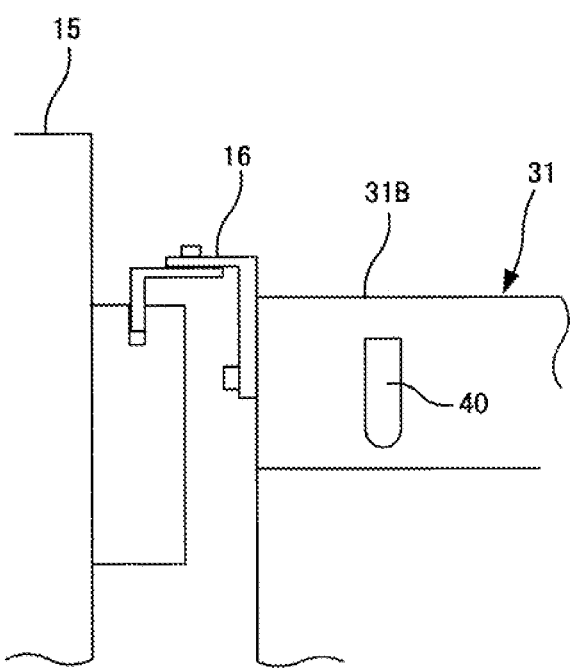
FIG. 9B is an enlarged front view showing the fixed structure of the tip portion.

FIG. 9A is a perspective view showing a structure in which the tip portion of the housing is fixed to the goniometer of the X-ray diffraction apparatus, and FIG. 9B is an enlarged front view showing a fixed structure of the tip portion.

The measurement position A set inside the housing 31 is positionally adjusted so as to coincide with the X-ray irradiation position (not shown) set in the X-ray diffraction apparatus 10 when the measurement system is constructed by combining the airtight box 30 for measurement with the X-ray diffraction apparatus 10. However, in a case where the X-ray diffraction apparatus 10 and the airtight box 30 for measurement are arranged independently of each other, the tip portion of the housing 31 is likely to sag downward because the sample stage 34 is mounted inside the housing 31 extending in the axial direction, so that there is a risk that the measurement position A set inside the housing 31 may deviate from the X-ray irradiation position set in the X-ray diffraction apparatus 10.

Therefore, in the present embodiment, as shown in FIGS. 9A and 9B, the tip portion of the housing 31 is fixed to the goniometer 15 of the X-ray diffraction apparatus 10 by a positioning member 16, whereby the housing 31 of the airtight box 30 for measurement is positioned with respect to the goniometer 15.

Specifically, the tip portion of the housing 31 is fixed to the goniometer 15 by using the positioning member 16 with the transport stage 35 abutting against the stopper 42 so as to cause the measurement position A set inside the housing 31 to coincide with the X-ray irradiation position set in the X-ray diffraction apparatus 10.

As a result, the tip portion of the housing 31 is prevented from sagging, and the measurement position A can be stably positioned at the X-ray irradiation position. Further, by removing the positioning member 16, the X-ray diffraction apparatus (measurement apparatus) 10 and the airtight apparatus (including the airtight box 30 for measurement and the glove box 20) can be easily separated from each other, so that each of the X-ray diffraction apparatus 10 and the airtight apparatus can be used as a single apparatus.

Figure 10A:
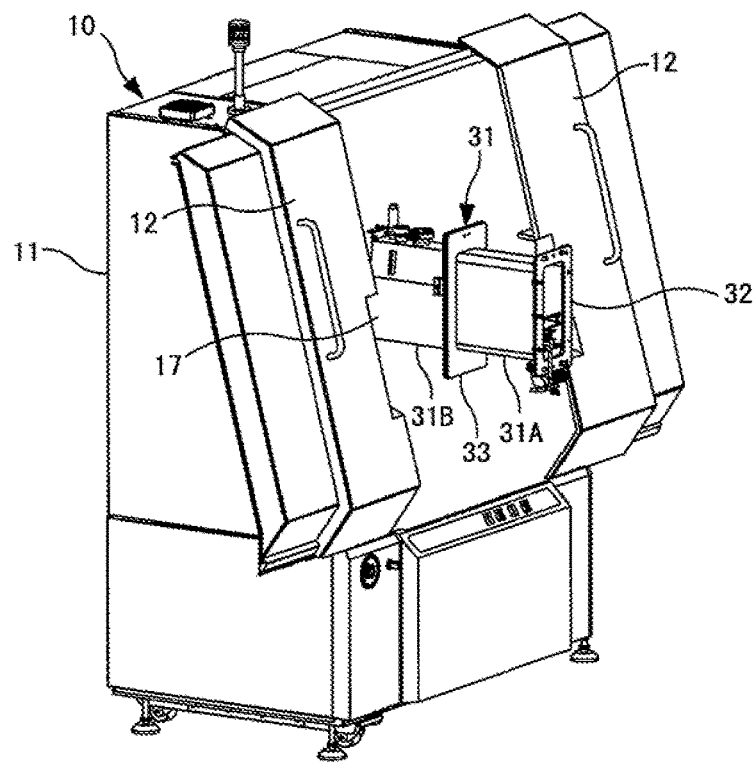
FIGS. 10A and 10B are perspective views that give a bird's-eye view showing the appearance of the measurement apparatus and the airtight box for measurement in order to show an X-ray shielding structure provided between an opening/closing door of the X-ray diffraction apparatus and an intermediate flange of the housing.
Figure 10B:
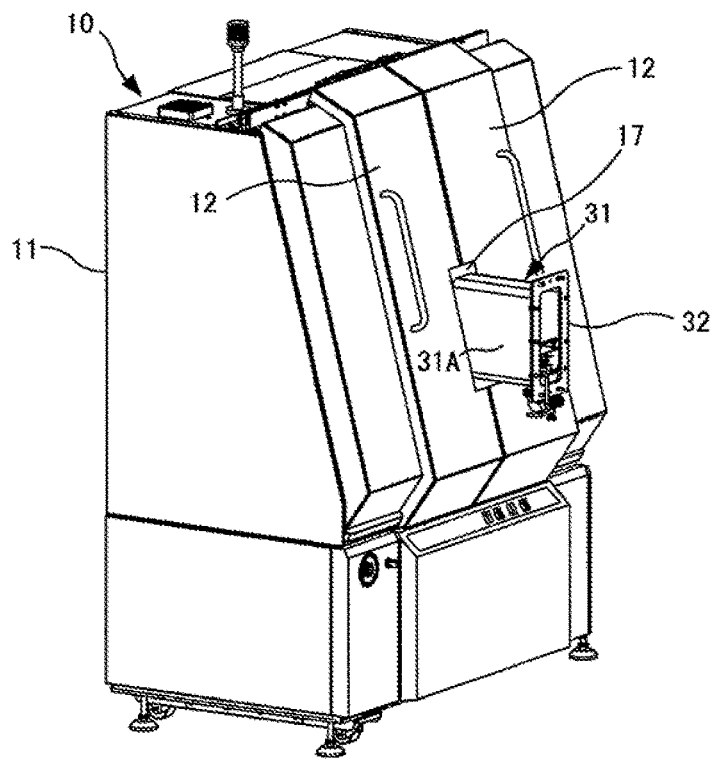
Figure 11A:
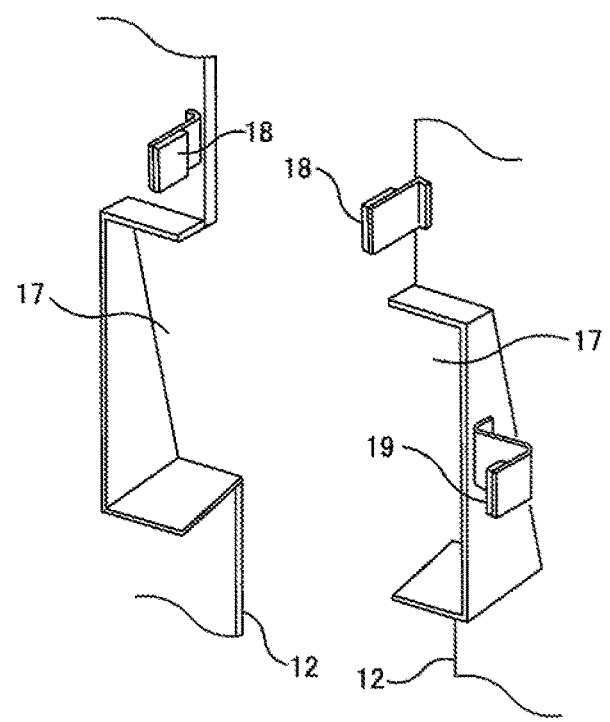
FIG. 11A is a perspective view of cutouts formed in the opening/closing door as viewed from a back surface side.
Figure 11B:
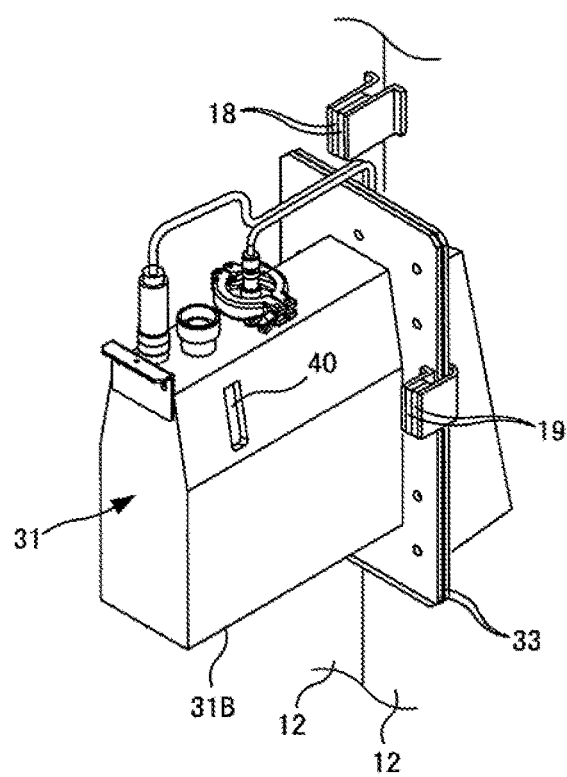
FIG. 11B is a perspective view of the X-ray shielding structure as viewed from a back surface side of the opening/closing door.

FIGS. 10A, 10B, 11A, and 11B are diagrams showing an X-ray shielding structure provided between the opening/closing door of the X-ray diffraction apparatus and an intermediate flange of the housing. Specifically, FIGS. 10A and 10B are perspective views that give a bird's-eye view of the appearance of the X-ray diffraction apparatus and the airtight box for measurement. FIG. 11A is a perspective view of cutouts formed in the opening/closing door as viewed from the back surface side. FIG. 11B is a perspective view of the X-ray shielding structure as viewed from the back surface side of the opening/closing door (that is, the inside of an X-ray shielding cover).

As shown in FIGS. 10A, 10B, and 11A, cutouts 17 and 17 are formed in the opening/closing doors 12 provided on the front surface of the X-ray shielding cover 11. These cutouts 17 and 17 form an opening for inserting a part of the housing 31 into the X-ray shielding cover 11. These cutouts 17 and 17 mate with each other while the opening/closing doors 12 are closed, thereby forming one opening (see FIG. 10B).

In the housing 31 of the airtight box 30 for measurement, the housing tip end portion 31B shown in FIG. 5A is inserted from the cutouts 17 into the X-ray shielding cover 11 and arranged there. Here, as shown in FIG. 11B, the intermediate flange 33 of the housing 31 is arranged so as to cover the peripheral edge portions of the cutouts 17 from the back surface side of the opening/closing doors 12. As a result, it is possible to prevent X-rays from leaking from the internal space of the X-ray diffraction apparatus covered by the X-ray shielding cover 11 through the cutouts 17 to the outside. In other words, the intermediate flange 33 of the housing 31 constitutes the X-ray shielding structure for the cutouts 17.

Further, as shown in FIG. 11B, a closing check sensor 18 is installed on the opening/closing doors 12, and the closing check sensor 18 detects a closed state of the opening/closing doors 12. Further, an X-ray shielding check sensor 19 is installed to be shared to the opening/closing door and the intermediate flange 33, and the X-ray shielding check sensor 19 detects that the peripheral edge portions of the cutouts 17 are covered by the intermediate flange 33 of the housing 31 from the back surface side.

Based on a detection signal from each of the proximity sensors 18 and 19, it is possible to prevent any operation of the X-ray diffraction apparatus 10 under a state where the opening/closing doors 12 are left open or the housing 31 is not arranged before the operation is executed.

Note that the foregoing configuration may be modified so that the closed state of the opening/closing doors 12 can be also detected by the sensor (X-ray shielding check sensor 19) provided to be shared to the opening/closing door 12 and the intermediate flange 33. In this case, the sensor (closing check sensor 18) provided to be shared to the opening/closing doors 12 may be omitted.

Figure 12:
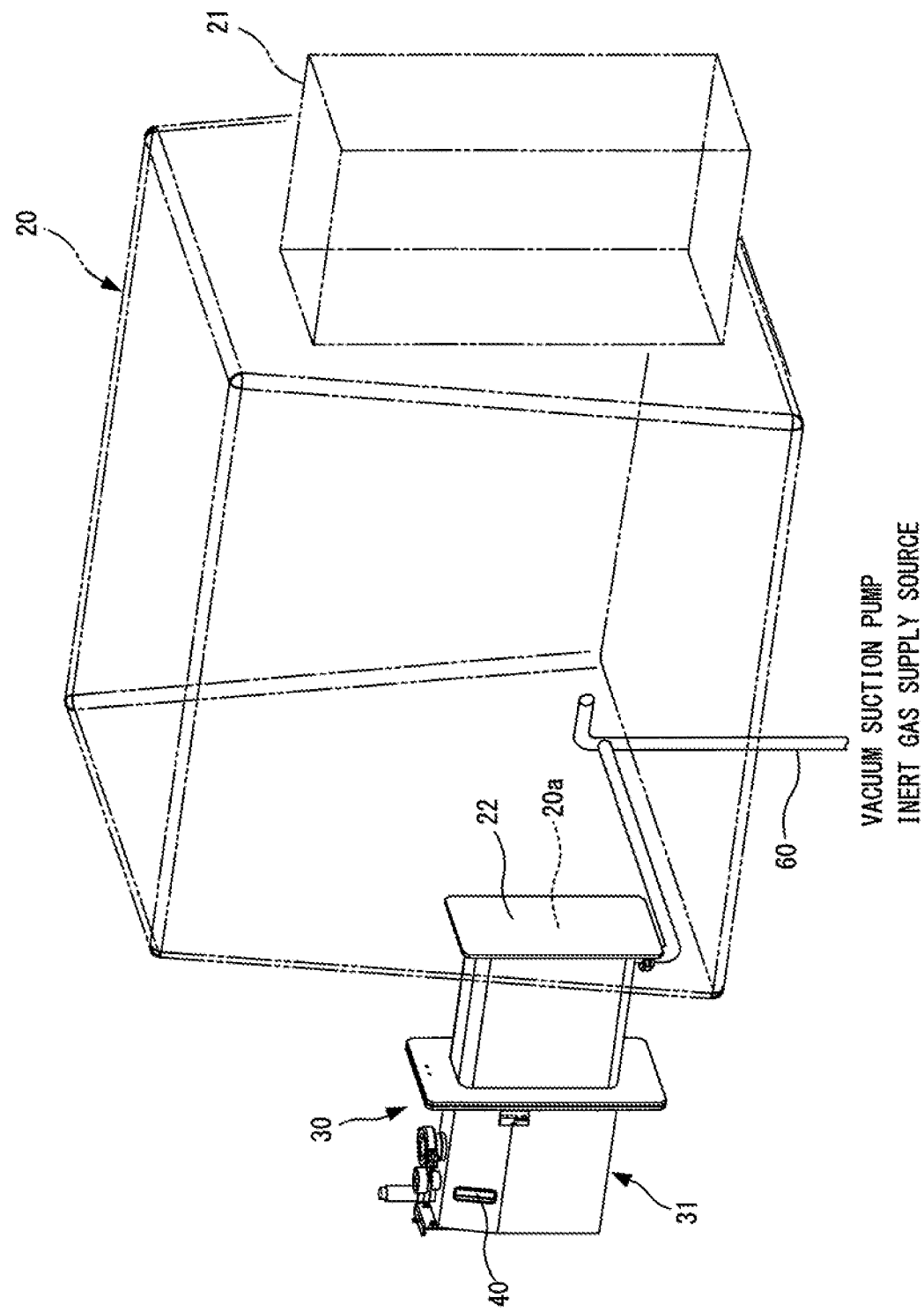
FIG. 12 is a perspective view showing a pipe connected to the glove box and the housing of the airtight box for measurement, and a blocking member for blocking an opening portion of the glove box.

FIG. 12 is a perspective view showing the pipes connected to the glove box and the housing of the airtight box for measurement, and the blocking member for blocking the opening portion of the glove box. As shown in FIG. 12, the pipe 60 is connected to each of the glove box 20 and the housing 31 of the airtight box 30 for measurement. Like the schematic structure shown in FIG. 1, these pipes 60 are configured to be connectable to any one of the vacuum suction pump 62 and the inert gas supply source 63 by switching the valve 61.

Further, the blocking member 22 is freely attachable to and detachable from the opening portion 20a of the glove box 20.

The connection of the pipes 60 to the glove box 20 and the housing 31 as described above makes it possible to set the inside of the airtight box 30 for measurement to the same atmospheric state as the inside of the glove box 20 even when the opening portion 20a of the glove box 20 is blocked by the blocking member 22 during maintenance of the airtight box 30 for measurement.

Further, the connection of the pipe 60 to the airtight box 30 for measurement makes it possible to uniformly and quickly set the inside of the airtight box 30 for measurement to the same atmospheric state as the inside of the glove box 20.

[Measurement Procedure]

According to the following procedure, the measurement system having the specific configuration described above can measure an anaerobic sample under an environment where the atmosphere is blocked.

A required atmosphere such as a vacuum atmosphere or an inert gas atmosphere is formed inside the glove box 20 and the housing 31. In other words, the inside of the housing 31 connected to the glove box 20 can be forcibly exhausted in a short time by a vacuum suction pump. Further, after the forced exhaust by the vacuum suction pump, inert gas can be purged and enclosed to form a required atmosphere.

The X-ray diffraction apparatus 10 is operated while the sample stage 34 in the housing 31 is caused to abut against the stopper 42 (see FIG. 7), thereby performing a height adjustment operation for the sample loading portion called half-split. Through this operation, the height of the sample loading portion is adjusted to the measurement position A in the housing 31.

Thereafter, as shown in FIGS. 2 and 4, a measurement target sample and necessary tools and the like are inserted into the glove box 20 via the antechamber 21 which is arranged side by side together with the glove box 20.

Next, the operator puts on the rubber gloves provided in the glove box 20 and operates the sample in the glove box from the outside to execute a pretreatment for X-ray diffraction measurement. Then, as shown in FIG. 4, the sample stage 34 installed inside the housing 31 is moved to the inside of the glove box 20, and the sample is loaded onto the sample stage 34. Subsequently, the sample stage 34 is moved into the housing 31, and stopped when it abuts against the stopper 42 (see FIG. 7). As described above, since the height has already been adjusted, the sample is placed at the measurement position A by stopping the sample stage 34 at a position where the sample stage 34 abuts against the stopper 42.

Thereafter, the X-ray diffraction apparatus 10 is operated to perform X-ray diffraction measurement on the sample in the housing 31. After the measurement is completed, the sample stage 34 in the housing 31 is moved to the inside of the glove box 20 again (see FIG. 4), and the measured sample is removed from the sample stage 34. Subsequently, after a necessary post-treatment is completed in the glove box 20, the sample is taken out to the outside via the antechamber 21.

Note that the present invention is not limited to the above-described embodiment, and it goes without saying that various modifications and applications can be implemented.

For example, the airtight box for measurement according to the present invention can be configured by using a well-known glove box. In that case, an existing glove box may be provided with a connecting unit to be connected to a connecting unit of the housing 31.

Since an energy source (a light source on the incident side) and the detector of the measurement apparatus can be installed in the atmosphere, these units of a general-purpose measurement apparatus can be used in combination with the airtight apparatus of the present invention to configure the measurement system according to the present invention.

In that case, a sample stage (a component for placing the sample at the measurement position) which has been provided in the existing measurement apparatus is removed in advance, and the sample stage which has been provided inside the airtight box for measurement is used.

When an existing X-ray diffraction apparatus is provided with an opening/closing door for shielding X-rays, a cutout corresponding to the cutout 17 described above is formed in the opening/closing door, and a part of the housing of the airtight box for measurement is inserted into the inside of the opening/closing door through the cutout.

The sample position adjustment mechanism for positioning the sample loaded on the sample stage to the measurement position may be configured by incorporating the sample stage with an XYZ table capable of performing not only position adjustment in an up-and-down direction (Z direction), but also position adjustment in an axial direction (Y direction) and a front-and-rear or lateral direction (X direction) of the housing.

FIGS. 1 and 12 show the configuration in which the branched pipes 60 are connected to the glove box 20 and the housing 31 of the airtight box 30 for measurement so that the glove box 20 and the housing 31 of the airtight box 30 for measurement communicate with the vacuum suction device and the inert gas supply source. However, the present invention is not limited to the above configuration, and the pipes may be configured as follows.

For example, pipes may be independently connected to the glove box 20 and the housing 31 of the airtight box 30 for measurement respectively so that each of the glove box 20 and the housing 31 of the airtight box 30 for measurement individually communicates with the vacuum suction device and the inert gas supply source.

The pipes to communicate with the vacuum suction device and the inert gas supply source may be connected to a plurality of places in the glove box 20 and the housing 31 of the airtight box 30 for measurement, if necessary.

Further, the pipes communicating with the vacuum suction device and the inert gas supply source may be connected to not only the glove box 20 and the housing 31 of the airtight box 30 for measurement, but also, for example, the antechamber 21 (pass box) attached to the glove box 20.

Figure 13A:
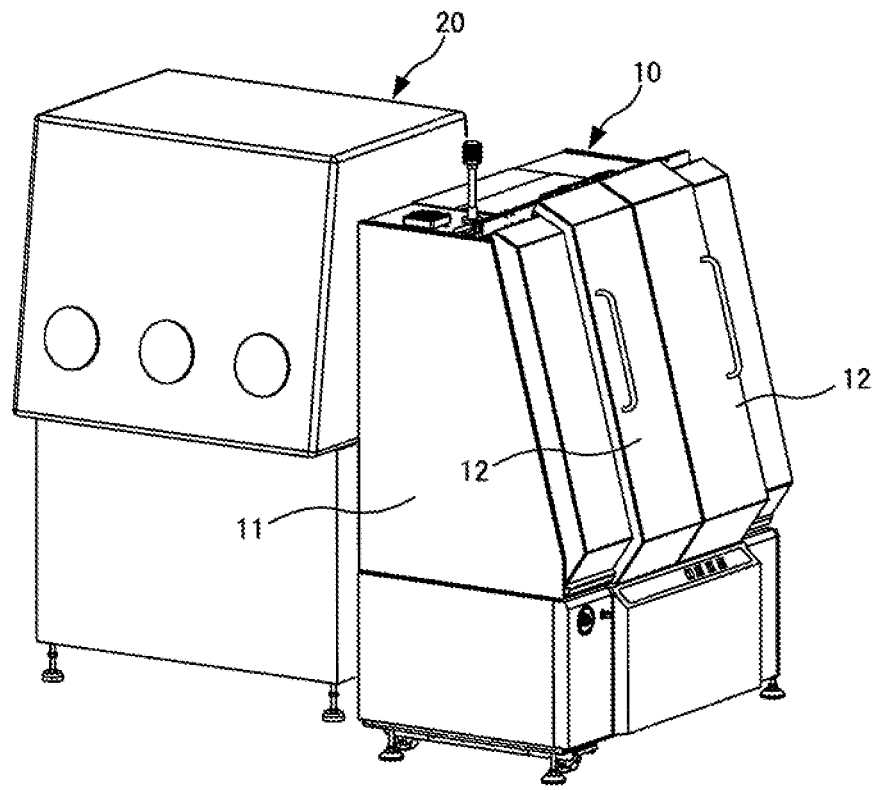
FIG. 13A is a perspective view showing another embodiment of the present invention.
Figure 13B:
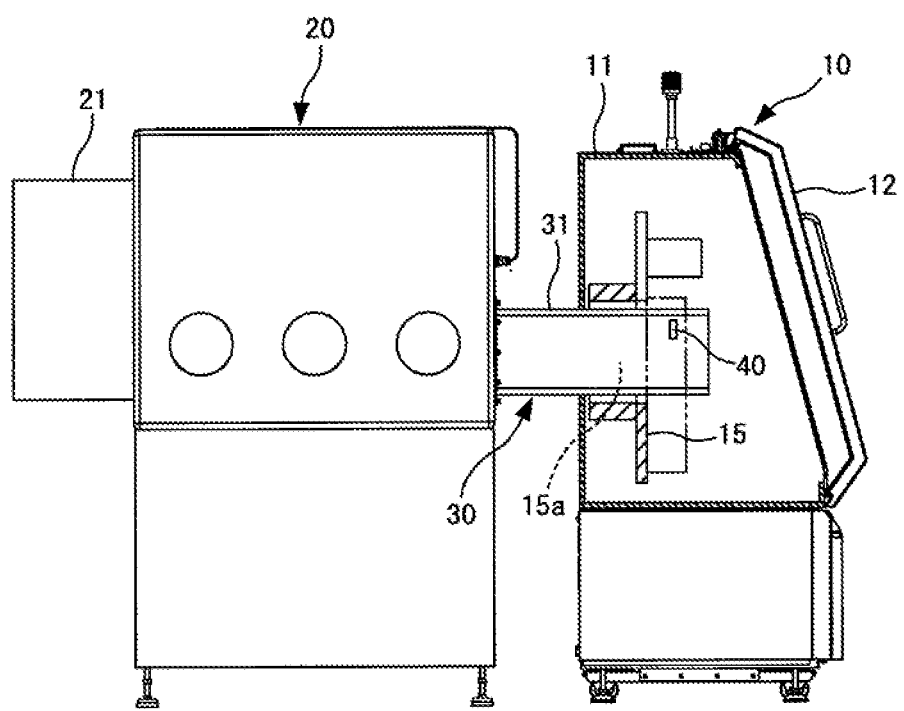
FIG. 13B is also a front view of the other embodiment.

As shown in FIGS. 13A and 13B, the present invention may be configured so that the shaft portion of the goniometer 15 is provided with an insertion hole 15a which is sized to enable the housing 31 of the airtight box 30 for measurement to pass therethrough, the housing 31 of the airtight box 30 for measurement is inserted from the back side of the goniometer 15 through the insertion hole 15a, and a part of the housing 31 is arranged in the internal space of the X-ray shielding cover 11. According to this configuration, it is not necessary to provide the cutout in the opening/closing door 12. Therefore, there is no need for an X-ray shielding structure for the cutout, and further there is an advantage that the work from the front side of the X-ray diffraction apparatus 10 can be easily performed.

The invention claimed is:

1. An airtight apparatus comprising:
    an airtight box for measurement for placing therein a sample to be measured by a measurement apparatus installed outside; and
    a glove box connected to the airtight box for measurement,
    wherein the glove box includes an opening portion,
    wherein the airtight box for measurement comprises:
    a housing that is hollow therein and has an opening in a side end surface and a connecting unit for causing the opening to communicate with the opening portion of the glove box;
    a sample stage including a sample loading portion;
    a measurement window that is provided in the housing to measure a sample loaded on the sample stage from the outside by the measurement apparatus; and
    a transport stage that is installed in the housing and transports the sample stage,
    wherein the transport stage is configured to extend a transport track of the sample stage up to the inside of the glove box communicating with the inside of the housing.

2. The airtight apparatus according to claim 1, wherein a measurement position is set inside the housing, and the airtight apparatus further comprises a sample position adjustment mechanism for positioning the sample loaded on the sample stage at the measurement position.

3. A measurement system comprising the measurement apparatus and the airtight apparatus according to claim 2, wherein the measurement apparatus includes a controller for outputting a control signal for controlling the sample position adjustment mechanism and is configured to measure a sample loaded on the sample stage through the measurement window.

4. The measurement system according to claim 3, wherein the measurement apparatus is an X-ray analysis apparatus including a goniometer, and the measurement system further comprises a positioning member for fixing and positioning the airtight box for measurement to the goniometer.

5. The airtight apparatus according to claim 1, further comprising a pipe communicating with the inside of the housing, wherein the pipe is configured to connect with at least one of a vacuum suction pipe and an inert gas supply source.

6. The airtight apparatus according to claim 1, wherein the measurement apparatus is an X-ray analyzing apparatus, and in the airtight apparatus that is configured so that X-rays are incident and emitted through the measurement window, the housing is formed of a material shielding X-rays, and the measurement window is formed of a material transmitting X-rays therethrough.

7. The airtight apparatus according to claim 6, further comprising an X-ray shielding member for shielding intrusion of X-rays from the inside of the housing into the glove box.

8. The airtight apparatus according to claim 7, wherein the X-ray shielding member is provided to the transport stage.

9. The airtight apparatus according to claim 7, wherein the transport stage includes a guide rail fixed to a floor surface of the housing, and a slider that slides along the guide rail, the sample stage is mounted on an upper surface of the slider, and the X-ray shielding member is provided at a position closer to the glove box than the sample stage on the slider.

10. The airtight apparatus according to claim 1, wherein the inside of each of the housing and the glove box is put into an airtight state.

11. The airtight apparatus according to claim 10, wherein the glove box includes a blocking member that blocks an opening portion communicating with the inside of the housing to partition off the inside of the glove box from the inside of the housing, thereby putting the inside of the glove box into an airtight state.

12. The airtight apparatus according to claim 1, wherein the transport stage includes a guide rail fixed to a floor surface of the housing, and a slider that slides along the guide rail, and the sample stage is mounted on an upper surface of the slider.

13. A measurement apparatus for measuring a sample loaded on a sample stage provided in an airtight apparatus through a measurement window,
wherein the airtight apparatus includes an airtight box for measurement for placing therein the sample to be measured by the measurement apparatus installed outside and a glove box connected to the airtight box for measurement;
wherein the glove box includes an opening portion,
wherein the airtight box for measurement comprises:
a housing that is hollow therein and has an opening in a side end surface and a connecting unit for causing the opening to communicate with the opening portion of the glove box;
the sample stage including a sample loading portion; and
the measurement window that is provided in the housing to measure the sample loaded on the sample stage from the outside by the measurement apparatus; and
wherein an opening/closing door is provided, a measurement position is set inside the opening/closing door, and the opening/closing door includes a cutout through which a part of the housing is inserted to arrange the measurement window at a position corresponding to the measurement position.

14. The measurement apparatus according to claim 13, wherein the cutout formed in the opening/closing door allows a part of the housing having a flange at an intermediate portion thereof to pass through the cutout, and is formed to be smaller than an outer shape of the flange, and a mount portion of the flange is provided near the inside of the opening/closing door.

15. The measurement apparatus according to claim 14, further comprising a sensor for detecting a state where the opening/closing door is closed and the flange is mounted at the mount portion.

* * * * *